July 15, 1930.  J. H. FISCH  1,770,467
POND ICE SAW
Filed April 6, 1928   4 Sheets-Sheet 3
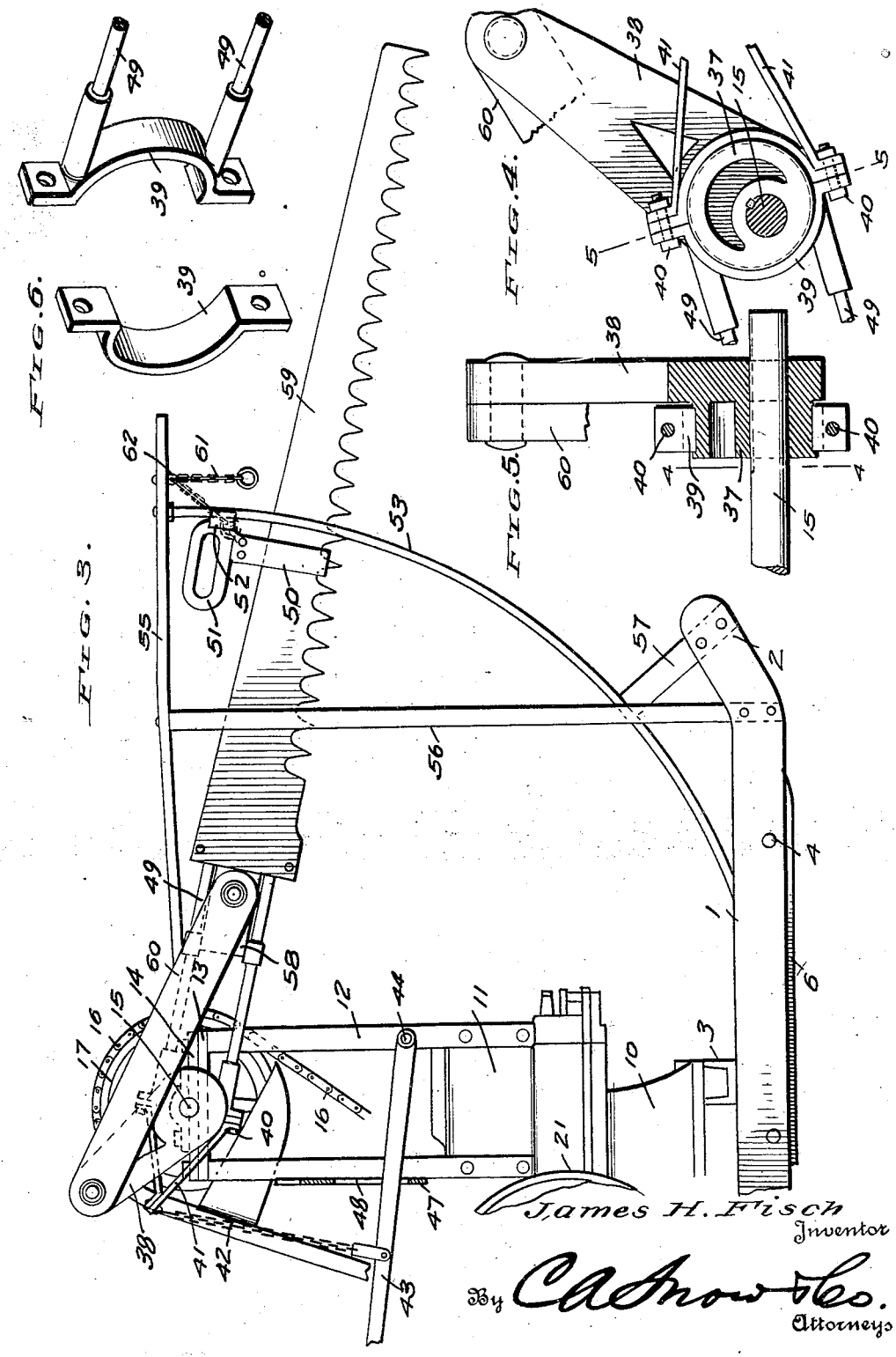

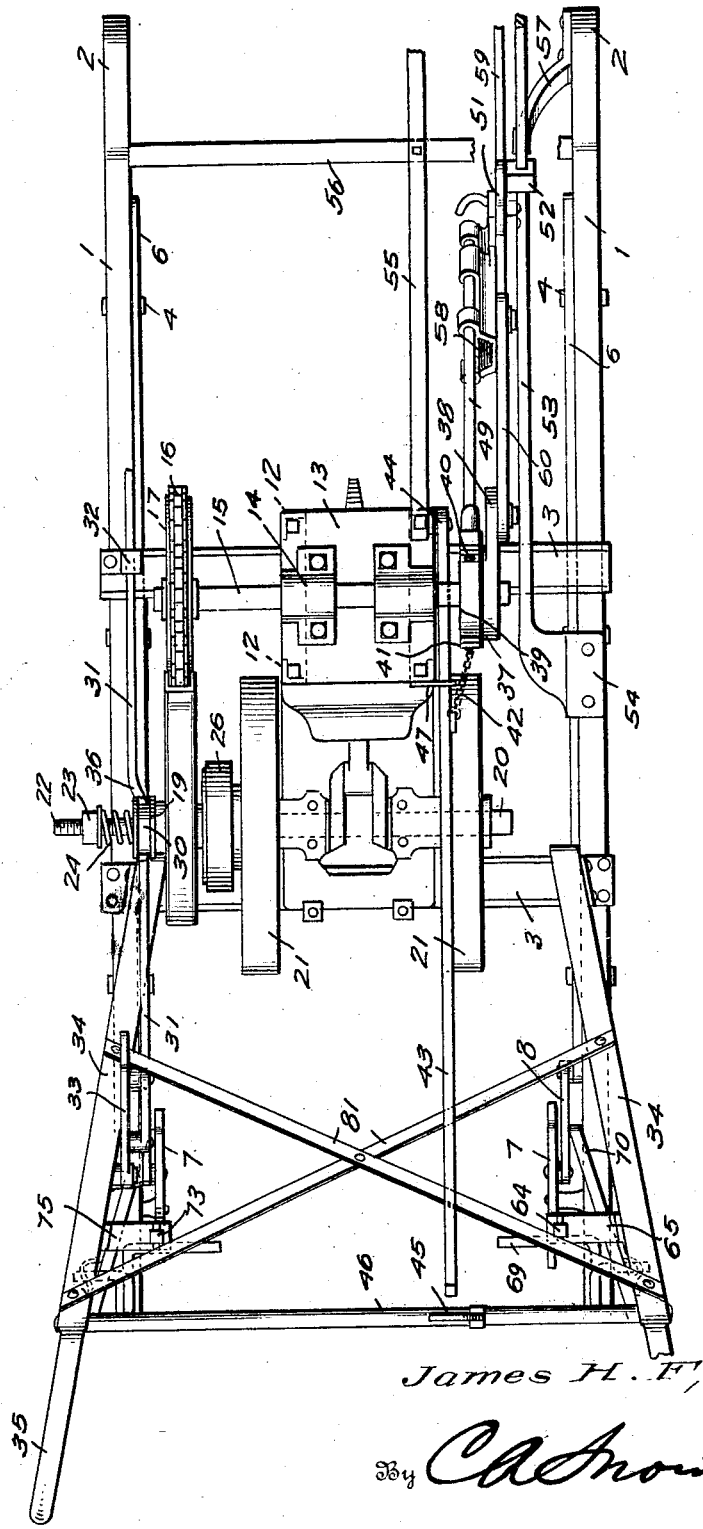

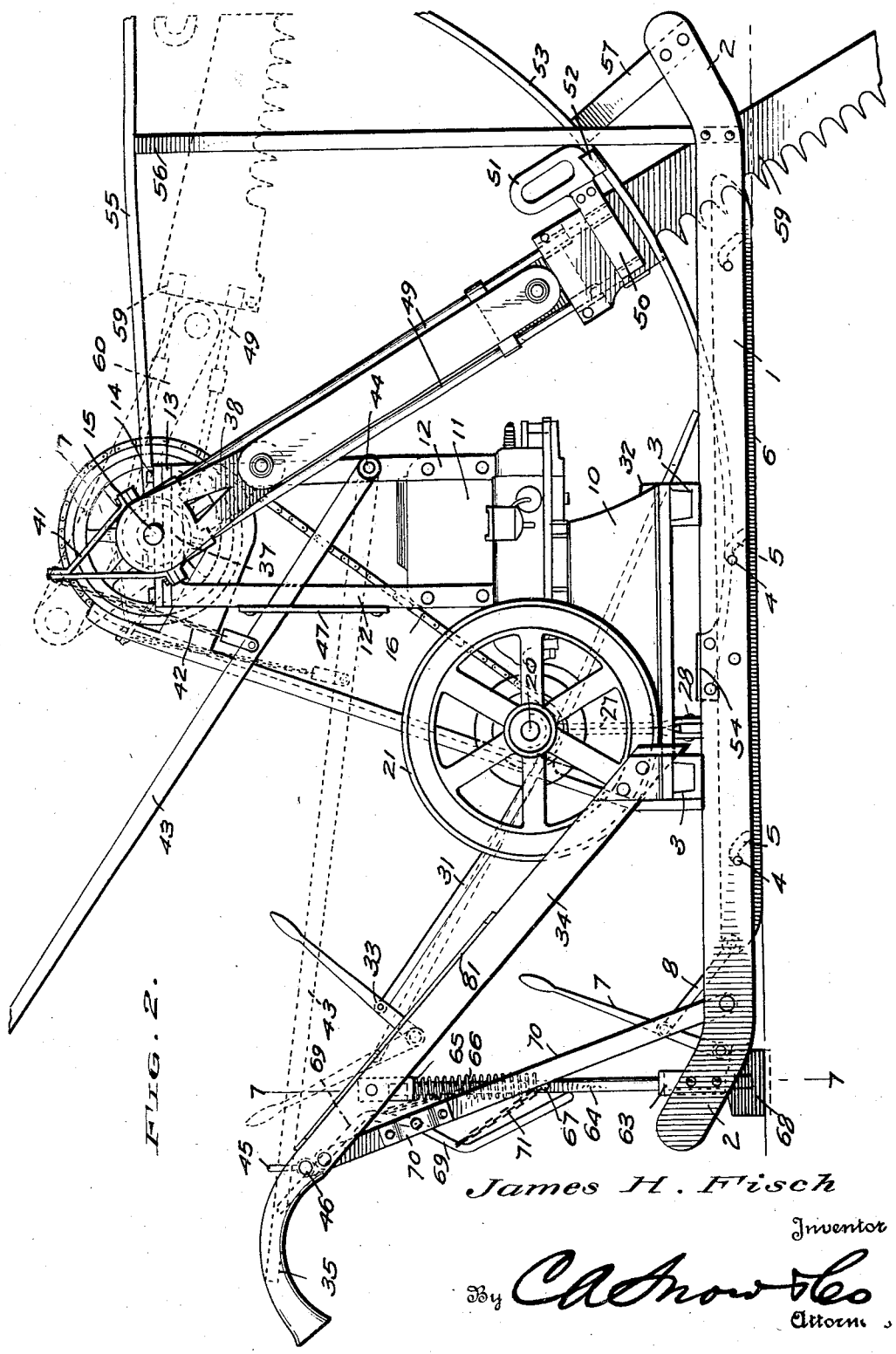

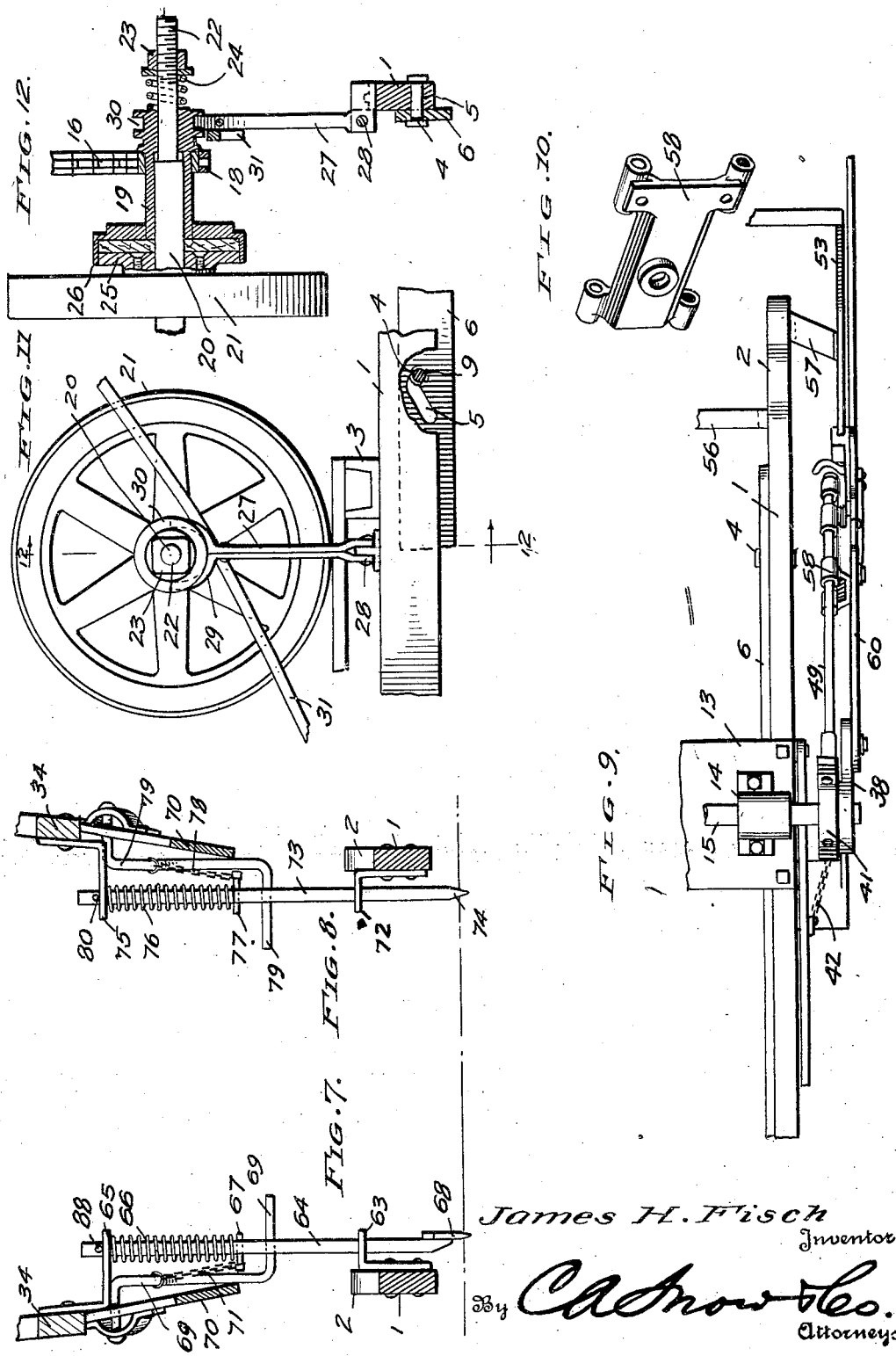

Patented July 15, 1930

1,770,467

UNITED STATES PATENT OFFICE

JAMES H. FISCH, OF BARNESVILLE, MINNESOTA

POND-ICE SAW

Application filed April 6, 1928. Serial No. 267,904.

This invention relates to a power operated saw for cutting pond and river ice, one of the objects being to provide a light, durable and efficient machine of this character which can be drawn readily by the operator, simple and effective means being utilized for guiding the machine during its movement.

Another object is to provide a machine of this type which can be tilted laterally and held in a tilted position when it is desired to cut the ice at an angle other than a right angle.

A further object is to provide anchoring means for holding the machine against movement during the sawing operation.

Another object is to provide a machine which is constantly under the control of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a top plan view of the machine.

Figure 2 is a side elevation, some of the positions of some of the parts being indicated by a broken line.

Figure 3 is a side elevation of a portion of the machine showing the saw secured in elevated position.

Figure 4 is an enlarged side elevation of a portion of the saw operating mechanism, said figure being more particularly a section on line 4—4, Figure 5.

Figure 5 is a section on line 5—5, Figure 4.

Figure 6 is a prospective view of the eccentric strap, the parts being separated.

Figure 7 is a transverse section through a portion of one side of the machine showing the guiding element and the parts connected thereto.

Figure 8 is a section through a portion of the other side of the machine showing the anchoring device.

Figure 9 is a top plan view of the saw operating mechanism, showing a slightly modified form.

Figure 10 is a perspective view of the crosshead of the saw operating mechanism.

Figure 11 is a side elevation of the flywheel and adjacent parts.

Figure 12 is a section on line 12—12, Figure 11.

Referring to the figures by characters of reference 1 designates runners having upturned ends 2, these runners being connected adjacent their centers by cross beams 3. Extending inwardly from each runner are studs 4 projecting through slots 5 formed within supplemental supporting strips 6 located upon the inner sides of the runners. These studs 4 are normally located in the lower ends of the slots 5 at which time the lower edges of the runners will rest upon a supporting surface. A lever 7 is pivotally connected to the rear end portion of each runner 1 and is connected by a link 8 to one end of the adjacent strip 6. Thus it will be seen that when the lever is moved in one direction it will thrust through link 8 against the strip 6 so that the slots 5 will be shifted relative to the studs 4 until said studs are received by the upper ends of the slots. As shown in the drawings these upper ends of the slots are slightly down-turned at 9 so that when the strip 6 reaches the limit of its movement in one direction, these down-turned portions 9 of the slots will provide seats for the lugs with the result that strips 6 will be held below the runners 1 as shown in Figures 2 and 11. Consequently the runner will be supported by the lowered strip in an elevated position. With one strip 6 shifted as described or, more properly speaking, with one runner 1 elevated relative to its strip 6, the machine can be supported in an inclined position, with one side higher than the other. By moving lever 7 in the opposite direction the elevated runner can be lowered on to the ice or other supporting surface.

The cross beams 3 constitute supports for the base 10 of an internal combustion engine. This engine has the usual water hopper or cooling tank 11 and secured to this tank or hopper are standards 12 connected at the top by a plate 13 on which are arranged the bearings 14 of a transverse shaft 15. This shaft is driven by a chain 16 mounted on a sprocket 17 carried by the shaft and the chain, in turn, receives motion from a sprocket 18 carried by a sleeve 19 slidably and rotatably mounted on the shaft 20 carrying the flywheels 21 of the engine. A threaded stem 22 projects from one end of the shaft and beyond the sleeve and carries an adjusting nut 23. This nut bears against a spring 24 which thrusts yieldingly against sleeve 19. A friction clutch member 25 is secured to and rotates with one of the flywheels 21 and the shaft 20 while another friction clutch member 26 is carried by and rotates with the sleeve 19. A supporting lever 27 is pivotally connected at 28 to one of the runners 1 and has a forked upper end 29 which is seated in an annular groove 30 formed in one end portion of the sleeve. Extending to one side of the supporting lever 27 is a shifting rod 31 mounted in a guide bracket 32 carried by one of the cross beams 3 (see Figure 1), this rod being attached at one end to an actuating lever 33. Said lever is fulcrumed on one of a pair of upwardly and rearwardly diverging handles 34. These handles are secured at their lower, forward ends to one of the beams 3 while their upper or rear ends have grips 35 adapted to be held by the operator. That portion of the rod 31 adjacent lever 27 is offset at an acute angle as shown at 36 in Figure 1 so that when the rod 31 is shifted in one direction it will thrust lever 27 laterally to push sleeve 19 against spring 24. This will result in uncoupling the sleeve from the shaft 20 by separating the clutch members 25 and 26. By shifting rod 31 in the opposite direction the lever 27 will be released and spring 24 will return sleeve 19 so as to bring clutch member 26 again into frictional engagement with clutch member 25. Thus it will be seen that the operation of shaft 15 can be controlled readily.

Secured to the shaft 15 is an eccentric 37 from which is extended a crank arm 38, the long radius of the eccentric being parallel with the longitudinal center of said arm. The eccentric is embraced by opposed straps 39, shown in detail in Figure 6, these straps being held together at their ends by bolts 40 which also serve to fixedly attach to the straps the connected members of a frame 41. This frame is provided at its free end with a chain 42 or other flexible connection for attaching the frame 41 to a lifting lever 43. One end of this lever is fulcrumed at 44 on one of the standards 12 while the other end thereof is adapted to be lowered into engagement with a retaining hook 45 mounted on a cross rod 46 which connects the handles 34 near the grips 35. A guide plate 47 is carried by one of the standards 12 and may be slotted longitudinally as shown at 48 in Figure 3 so as to guide lever 43 during its up and down movement.

Extending from the eccentric strap 39 opposite the frame 41 are parallel guide rods 49 and those ends of the rods remote from the eccentric are connected by a guide yoke 50 having a handle 51. This handle is formed with an integral slide 52 designed to work along an arcuate guide rail 53 which is concentric with shaft 15 and is fixedly mounted at its lower end upon one of the runners 1, said end of the rail 53 being formed with a laterally extended wing 54 extending over and fastened to the runner. The forward or upper end of the guide rail is secured to a forwardly extending supporting strip 55 one end of which is attached to the plate 13 while at an intermediate point said strip is provided with a supporting yoke 56 mounted on and extending upwardly from the forward end portions of the runners. At an intermediate point the rail 53 can be reinforced and supported by a standard 57 extended from the forward end of one of the runners.

Slidably mounted on the guide rods 49 is a crosshead 58 shown in detail in Figure 10 and fixedly attached to this crosshead is one end of an elongated saw blade 59 designed primarily for cutting ice. A pitman 60 connects the crosshead 58 to the crank arm 38.

For the purpose of supporting the saw in elevated position a chain or other flexible element indicated at 61 is attached to the yoke 50 and is adapted to be connected to a supporting hook or the like shown at 62, said hook being carried by the strip 55. When the saw is not supported in this manner it will of course gravitate into contact with the ice to be sawed. Rotation of shaft 15 will result in oscillation of the guide rods 49 and the saw while, at the same time, the saw will be reciprocated relative to the rods.

Connected to one of the runners 1 near the rear end thereof is a guide bracket 63 in which is slidably mounted a rod 64. This rod is preferably angular in cross section so that it will not rotate in the bracket. Another bracket 65 is extended from one of the handles 34 and is slidably engaged by the rod. A spring 66 is mounted on the rod and thrusts upwardly against bracket 65 and downwardly against a pin 67 carried by the rod. A guiding blade 68 is connected to the lower end of the rod and the spring 66 serves to hold this blade normally pressed downwardly where it can work within a saw cut or a kerf formed in the ice. Obviously by utilizing this blade the operator can properly guide the machine to cut ice blocks of predetermined width. A lifting lever 69 is pivotally connected to one of a pair of braces 70 provided for the handles 34 and connected to each lever at a point between its ends is a chain or other flexible element indicated at 71. This flexible element is attached to the rod 64. It will be noted that lever 69 has an offset intermediate portion to which the flexible element 71 is attached. Thus when the lever 69 is swung upwardly and forwardly past its dead center, the rod 64 will be pulled upwardly against the action of its spring and will be maintained in elevated position because the spring, by its continued downward thrust, will bind the lifted lever 69 against the cross-rod 46 as shown by broken lines in Figure 2.

Secured to the runner 1 at the other side of the machine close to the rear end thereof, is a guide bracket 72 in which is slidably mounted an anchoring rod 73 the lower end of which is pointed as shown at 74. Another guide bracket 75 is secured to the adjacent handle 34 and serves to guide the rod. A spring 76 is mounted on the rod and thrusts upwardly against bracket 75 and downwardly against the pin 77 carried by the rod. This pin is connected by a chain 78 or the like to the intermediate portions of a lever 79 similar to lever 69 and mounted in one of the braces 70. Obviously the spring 76 acts to thrust the pointed end of the rod into the ice thereunder, thus to hold the machine against sliding movement. By swinging lever 79 upwardly past its dead center and against rod 46, the rod 73 will be lifted and held. The downward movement of rod 73 and of rod 64 is limited by any preferred means such as a pin 80 located above the upper guide bracket of the rod.

It is to be understood of course that the machine can be provided with suitable braces wherever found expedient. For example crossed braces 81 can be connected to the handles 34.

In practice the machine is placed on the ice to be cut with its runners parallel with the line of direction of cut. The blade 68 is lowered into a saw cut or guiding kerf previously formed and the anchoring rod 73 is lowered to hold the machine against movement. The engine is started and lever 43 is raised so as to allow the saw to swing downwardly into contact with the ice. Rod 31 is then shifted to couple the saw operating mechanism to the engine whereupon the saw blade will be simultaneously reciprocated and oscillated and will work into and through the ice in the path thereof. This blade will gradually swing downwardly to a vertical position, it being guided in its course by the rail 53. When the blade reaches the lower limit of its movement the operator lifts the anchoring rod 73 to inactive position and then walks backwardly pulling the machine with him. During this movement the machine can be guided by the blade 68 and the end of the saw cut will act to swing the saw blade upwardly relative to the surface of the ice. After the machine has been brought to position where the free end of the saw blade is seated in the saw cut, the anchoring pin 73 is lowered. The saw blade which had previously been stopped in its reciprocation by the shifting of the friction clutch, is again started by throwing the clutch and another cut will be made into the ice. The foregoing operation is then repeated until a cut of desired length has been made in the ice. Thereafter the saw blade can be raised by pulling on the handle 51 and can be supported by the chain 61. The machine can then be pushed or pulled to a new position. As already explained, should an inclined cut be desired instead of a vertical cut, one of the runners 1 can be elevated and supported by its strip 6.

In Figure 9 there has been shown a structure wherein the saw is located beyond one side of the machine.

What is claimed is:

1. An ice sawing machine including runners, a motor supported thereby, an angularly adjustable saw-guiding means supported at one end by the motor, a saw slidable on the guiding means, and saw operating mechanism supported by the motor.

2. An ice sawing machine including runners, a motor supported thereby, an arcuate guide fixedly connected to the runners adjacent one end thereof, saw guiding means slidably engaging said guide, a saw mounted for reciprocation in its guiding means, and mechanism supported by the motor for actuating the saw.

3. In an ice sawing machine, runners, handles connected to the runners at one end, an arcuate guide rail connected to the runners and adjacent the other end, a saw guide slidable on the rail, a saw mounted for reciprocation in its guide, a motor supported by the runners, and saw operating and supporting means supported by the motor.

4. An ice sawing machine including runners, handles extending from end of the machine, an arcuate guide rail at the other end of the machine, a motor between the handles and guide rail, a saw, means supported by the motor for supporting and actuating the saw, and a saw guide slidably engaging the rail.

5. An ice sawing machine including runners, cross beams connecting the same, a motor mounted on the beams, a saw mounted for swinging movement, an arcuate guide for the saw, and means supported by the motor for actuating the saw to reciprocate it.

6. In an ice sawing machine the combination of runners and a motor supported thereby, of a saw mounted for up and down swinging movement, means driven and supported by the motor for actuating the saw, normally depressed anchoring means for engaging the surface being cut, and means for lifting and supporting the anchoring means out of engagement with said surface.

7. An ice sawing machine including runners, a motor operated saw supported thereby and adapted to swing downwardly, supporting strips connected to the respective runners, separate means for shifting said strips longitudinally relative to the runners independently of each other, and cooperating means on the strips and runners whereby the respective runners are raised or lowered when the strips thereon are shifted longitudinally.

8. An ice sawing machine including runners, a motor operated saw supported thereby and adapted to swing downwardly, supporting strips connected to the respective runners, separate means for shifting said strips longitudinally relative to the runners independently of each other, and cooperating means on the strips and runners whereby the respective runners are raised or lowered when the strips thereon are shifted longitudinally, said means including projections on the runners, there being inclined slots in the strips into which the projections extend, each slot having a downturned portion at its upper end providing a seat for the extensions when the strip has been shifted to one limit of its movement.

In testimony that I claim the foregoing as my own, I have hereto affixed my signature.

JAMES H. FISCH.